US012204856B1

(12) United States Patent
Somasundaran et al.

(10) Patent No.: US 12,204,856 B1
(45) Date of Patent: Jan. 21, 2025

(54) TRAINING AND DOMAIN ADAPTATION FOR SUPERVISED TEXT SEGMENTATION

(71) Applicant: Educational Testing Service, Princeton, NJ (US)

(72) Inventors: Swapna Somasundaran, Plainsboro, NJ (US); Goran Glavaš, Heidelberg (DE)

(73) Assignee: Educational Testing Service, Princeton, NJ (US)

( * ) Notice: Subject to any disclaimer, the term of this patent is extended or adjusted under 35 U.S.C. 154(b) by 528 days.

(21) Appl. No.: 17/482,548

(22) Filed: Sep. 23, 2021

Related U.S. Application Data (60) Provisional application No. 63/089,724, filed on Oct. 9, 2020.

(51) Int. Cl.
*G06F 40/284* (2020.01)
*G06F 18/214* (2023.01)
*G06N 3/04* (2023.01)
*G06N 3/08* (2023.01)

(52) U.S. Cl.
CPC .......... *G06F 40/284* (2020.01); *G06F 18/214* (2023.01); *G06N 3/04* (2013.01); *G06N 3/08* (2013.01)

(58) Field of Classification Search
None
See application file for complete search history.

(56) References Cited

U.S. PATENT DOCUMENTS

| 11,862,146 B2* | 1/2024 | Han | G06N 3/045 |
| 11,868,895 B2* | 1/2024 | Huang | G06N 3/04 |
| 2021/0183484 A1* | 6/2021 | Shaib | G06F 40/295 |

OTHER PUBLICATIONS

Xing et al. "Improving Context Modeling in Neural Topic Segmentation". arXiv:2010.03138v1 [cs.CL] Oct. 7, 2020 (Year: 2020).*
Lukasik et al. "Text Segmentation by Cross Segment Attention". arXiv:2004.14535v1 [cs.CL] Apr. 30, 2020 (Year: 2020).*
Angheluta, Roxana, De Busser, Rik, Moens, Marie-Francine; The Use of Topic Segmentation for Automatic Summarization; Proceedings of the ACL-2002 Workshop on Automatic Summarization; 2002.

(Continued)

*Primary Examiner* — Jesse S Pullias
(74) *Attorney, Agent, or Firm* — Jones Day (57) ABSTRACT

Data such as unstructured text is received that includes a sequence of sentences. This received data is then tokenized into a plurality of tokens. The received data is segmented using a hierarchical transformer network model including a token transformer, a sentence transformer, and a segmentation classifier. The token transformer contextualizes tokens within sentences and yields sentence embeddings. The sentences transformer contextualizes sentence representations based on the sentence embedddings. The segmentation classifier predicts segments of the received data based on the contextualized sentence representations. Data can be provided which characterizes the segmentation of the received data. Related apparatus, systems, techniques and articles are also described.

20 Claims, 3 Drawing Sheets

(56) References Cited

OTHER PUBLICATIONS

Bayomi, Mostafa, Lawless, Seamus; C-HTS: A Concept-Based Hierarchical Text Segmentation Approach; Proceedings of the 11th International Conference on Language Resources and Evaluation; Miyazaki, Japan; pp. 1519-1528; May 2018.

Beeferman, Doug, Berger, Adam, Lafferty, John; Statistical Models for Text Segmentation; Machine Learning, 34(1-3); pp. 177-210; 1999.

Bokaei, Mohammad Hadi, Sameti, Hossein, Liu, Yang; Extractive Summarization of Multi-Party Meetings Through Discourse Segmentation; Natural Language Engineering, 22(1); pp. 41-72; 2016.

Brants, Thorsten, CHEN, Francine, Tsochantaridis, Ioannis; Topic-Based Document Segmentation with Probabilistic Latent Semantic Analysis; Proceedings of the 11th International Conference on Information and Knowledge Management; pp. 211-218; Nov. 2002.

Chen, Harr, Branavan, S.R.K., Barzilay, Regina, Karger, David; Global Models of Document Structure Using Latent Permutations; Proceedings of the Human Language Technologies: The 2009 Annual Conference of the North American Chapter of the Association for Computational Linguistics; pp. 371-379; May 2009.

Choi, Freddy; Advances in Domain Independent Linear Text Segmentation; Proceedings of the 1st North American Chapter of the Association for Computational Linguistics; pp. 26-33; Apr. 2000.

Du, Lan, Buntine, Wray, Johnson, Mark; Topic Segmentation with a Structured Topic Model; Proceedings of the Conference of the North American Chapter of the Association for Computational Linguistics: Human Language Technologies; Atlanta, GA; pp. 190-200; Jun. 2013.

Eisenstein, Jacob; Hierarchical Text Segmentation from Multi-Scale Lexical Cohesion; Proceedings of the Conference of the North American Chapter of the Association for Computational Linguistics: Human Language Technologies; Boulder, CO; pp. 353-361; Jun. 2009.

Fragkou, Pavlina, Petridis, V., Kehagias, Athanasios; A Dynamic Programming Algorithm for Linear Text Segmentation; Journal of Intelligent Information Systems, 23(2); pp. 179-197; 2004.

Glavas, Goran, Nanni, Federico, Ponzetto, Simone Paolo; Unsupervised Text Segmentation Using Semantic Relatedness Graphs; Proceedings of the 5th Joint Conference on Lexical and Computational Semantics; Berlin, Germany; pp. 125-130; Aug. 2016.

Glavas, Goran, Somasundaran, Swapna; Two-Level Transformer and Auxiliary Coherence Modeling for Improved Text Segmentation; Proceedings of the 34th AAAI Conference on Artificial Intelligence; pp. 7797-7804; 2020.

Hearst, Marti; Multi-Paragraph Segmentation of Expository Text; Proceedings of the 32nd Annual Meeting on Association for Computational Linguistics; pp. 9-16; Jun. 1994.

Hendrycks, Dan, Gimpel, Kevin; Gaussian Error Linear Units (GELUs); arXiv:1606.08415; 2016.

Houlsby, Neil, Giurgiu, Andrei, Jastrzebski, Stanislaw, Morrone, Bruna, de Laroussilhe, Quentin, Gesmundo, Andrea, Attariyan, Mona, Gelly, Sylvain; Parameter-Efficient Transfer Learning for NLP; International Conference on Machine Learning; 2790-2799; 2019.

Huang, Xiangji, Peng, Fuchun, Schuurmans, Dale, Cercone, Nick, Robertson, Stephen; Applying Machine Learning to Text Segmentation for Information Retrieval; Information Retrieval, 6(3-4); pp. 333-362; 2003.

Kingma, Diederik, BA, Jimmy Lei; ADAM: A Method for Stochastic Optimization; ICLR; 2015.

Koshorek, Omri, Cohen, Adir, Mor, Noam, Rotman, Michael, Berant, Jonathan; Text Segmentation as a Supervised Learning Task; Proceedings of the 2018 Conference of the North American Chapter of the Association for Computational Linguistics: Human Language Technologies, vol. 2 (Short Papers); New Orleans, LA; pp. 469-473; Jun. 2018.

Li, Jing, Chiu, Billy, Shang, Shuo, Shao, Ling; Neural Text Segmentation and Its Application to Sentiment Analysis; IEEE Transactions on Knowledge and Data Engineering; Mar. 2020.

Liu, Yinhan, Ott, Myle, Goyal, Naman, Du, Jingfei, Joshi, Mandar, Chen, Danqi, Levy, Omer, Lewis, Mike, Zettlemoyer, Luke, Stoyanov, Veselin; ROBERTa: A Robustly Optimized BERT Pretraining Approach; arXiv:1907.11692; Jul. 2019.

Misra, Hemant, Yvon, Francois, Jose, Joemon, Cappe, Olivier; Text Segmentation Via Topic Modeling: An Analytical Study; Proceedings of the 18th ACM Conference on Information and Knowledge Management; pp. 1553-1556; Nov. 2009.

Pfeiffer, Jonas, Vulic, Ivan, Gurevych, Iryna, Ruder, Sebastian; MAD-X: An Adapter-Based Framework for Multi-Task Cross-Lingual Transfer; arXiv:2005.00052; 2020.

Prince, Violaine, Labadie, Alexandre; Text Segmentation Based on Document Understanding for Information Retrieval; International Conference on Application of Natural Language to Information Systems; pp. 295-304; Jun. 2007.

Rebuffi, Sylvestre-Alvise, Bilen, Hakan, Vedaldi, Andrea; Efficient Parametrization of Multi-Domain Deep Neural Networks; Computer Vision and Pattern Recognition, arXiv:1803.10082; 2018.

Riedl, Martin, Biemann, Chris; TopicTiling: A Text Segmentation Algorithm Based on LDA; Proceedings of the 2012 Student Research Workshop; Jeju, Republic of Korea; pp. 37-42; Jul. 2012.

Ruckle, Andreas, Pfeiffer, Jonas, Gurevych, Iryna; MultiCQA: Zero-Shot Transfer of Self-Supervised Test Matching Models on a Massive Scale; Proceedings of the 2020 Conference on Empirical Methods in Natural Language Processing; pp. 2471-2486; Nov. 2020.

Shtekh, Gennady, Kazakova, Polina, Nikitinsky, Nikita, Skachkov, Nikolay; Exploring Influence of Topic Segmentation on Information Retrieval Quality; International Conference on Internet Science; pp. 131-140; 2018.

Utiyama, Masao, Isahara, Hitoshi; A Statistical Model for Domain-Independent Text Segmentation; Proceedings of the 39th Annual Meeting of the Association for Computational Linguistics; pp. 499-506; Jul. 2001.

Vaswani, Ashish, Shazeer, Noam, Parmar, Niki, Uszkoreit, Jakob, Jones, Llion, Gomez, Aidan, Kaiser, Lukasz, Polosukhin, Illia; Attention Is All You Need; 31st Conference on Neural Information Processing Systems; Long Beach, CA; pp. 5998-6008; 2017.

Xia, Huosong, Tao, Min; Wang, Yi; Sentiment Text Classification of Customers Reviews on the Web Based on SVM; Sixth International Conference on Natural Computation; Yantai, China; pp. 3633-3637; Sep. 2010.

\* cited by examiner

TRAINING AND DOMAIN ADAPTATION FOR SUPERVISED TEXT SEGMENTATION

RELATED APPLICATION

This application claims priority to U.S. Pat. App. Ser. No. 63/089,724 filed on Oct. 9, 2020, the contents of which are hereby fully incorporated by reference.

TECHNICAL FIELD

The subject matter described herein relates to machine learning-based techniques for organizing long texts into coherent segments.

BACKGROUND

Organizing long texts into coherent segments facilitates human text comprehension as well as down-stream computer implemented processes such as text summarization, passage retrieval, and sentiment analysis. Text segmentation is important in that it enables large-scale passage extraction. Educators, for example, need to extract coherent passage segments from books to create reading materials for students. Similarly, test developers must create reading assessments at scale by extracting coherent segments from a variety of sources.

SUMMARY

In a first aspect for text segmentation, data is received (e.g., unstructured text, etc.) that includes a sequence of sentences. This received data is then tokenized into a plurality of tokens. The received data is segmented using a hierarchical transformer network model including a token transformer, a sentence transformer, and a segmentation classifier. The token transformer contextualizes tokens within sentences and yields sentence embeddings. The sentences transformer contextualizes sentence representations based on the sentence embeddings. The segmentation classifier predicts segments of the received data based on the contextualized sentence representations. Data can be provided which characterizes the segmentation of the received data.

Providing data in this regard can include one or more of causing the provided data to be displayed in an electronic visual display, transmitting the provided data to a remote computing device, storing the provided data in physical persistence, or loading the provided data into memory.

The token transformer can include a plurality of layers each including a bottleneck adapter. A first of the bottleneck adapters can be positioned after a multi-head attention sublayer and a second of the bottleneck adapters can be positioned after a feed-forward sublayer.

The hierarchical transformer network model can be trained using a dataset built from educational reading materials. In addition in some alternatives, the
  hierarchical transformer network model can be trained using a dataset built from a non-educational domain.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides more precise text segmentation and provides enhanced machine learning model transfer capabilities through adapter-based fine-tuning.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to machine learning-based techniques for organizing long texts into coherent segments and, in particular, to domain transfer of supervised text segmentation models, with a focus on the educational domain. To investigate the effects of domain transfer in supervised text segmentation, K12SEG, a segment-annotated dataset was automatically created from educational texts designed for grade-1 to college-level student population. A hierarchical neural text segmentation model (HITS) was benchmarked in a range of in-domain and domain-transfer segmentation experiments involving WIKI727 and the new K12SEG dataset.

Figure 1:
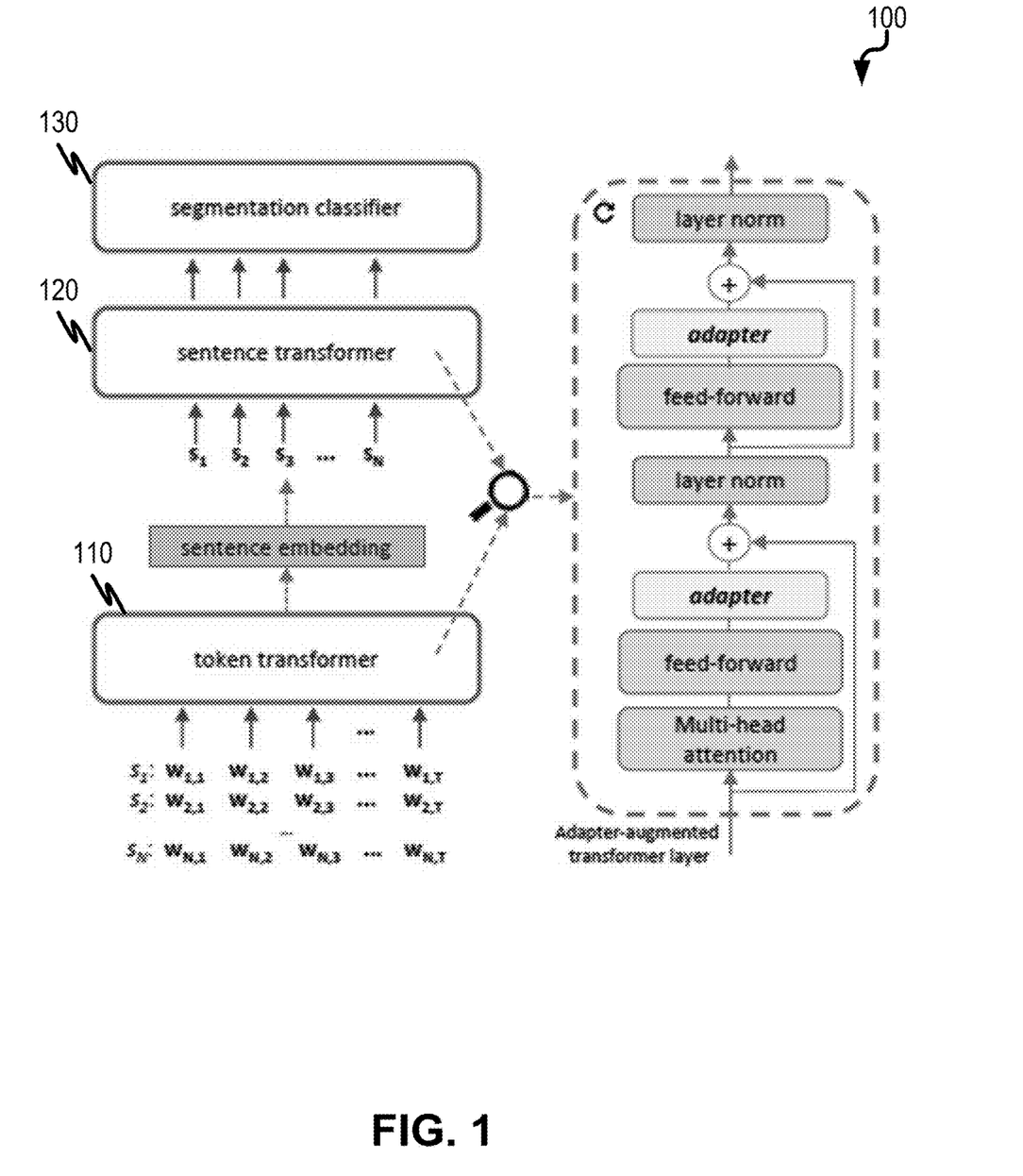
FIG. 1 is an architecture diagram illustrating an adapter-augmented hierarchical model for supervised text segmentation.

FIG. 1 is a diagram 100 illustrating an architecture of an adapter-augmented hierarchical model for supervised text segmentations. With this HITS model, the parameters of the lower (token-level) token transformer 110 can be initialized with the weights of the pretrained RoBERTa. In addition, aiming to prevent both (1) forgetting of distributional information captured in RoBERTa's parameters and (2) overfitting to the training domain—the layers of the token-level transformer 110 can be augmented with adapter parameters before segmentation training. With this arrangement, adapter-based fine-tuning only updates the additional adapter parameters and the original transformer parameters are frozen: this fully preserves the distributional knowledge obtained in transformer's pretraining. Encoding out-of-domain segmentation knowledge (e.g., from the WIKI727 dataset) separately from the distributional information (original RoBERTa parameters) as provided herein allows for the combination of the two types of information more flexibly during the secondary segmentation training in the target domain (e.g., on K12SEG), resulting in more effective domain transfer.

Experimental results confirmed the advantages of the current techniques. The adapter-augmented HITS model trained on WIKI727, besides yielding state-of-the-art in-domain (Wikipedia) segmentation performance, facilitates domain transfer and leads to substantial gains in the target educational domain (K12SEG).

Hierarchical Transformer-Based Model. The base segmentation model as illustrated in FIG. 1 comprises two hierarchically linked transformers: the lower token transformer 110 contextualizes tokens within sentences and yields sentence embeddings; the upper sentence transformer 120 then contextualizes sentence representations. An individual training instance is a sequence of N sentences, $\{S_1, \ldots, S_N\}$, each consisting of T (subword) tokens, $S_i = \{W_{i,1}, \ldots, W_{1,T}\}$. The lower transformer 110 can be initialized with the pretrained RoBERTa weights. The transformed vector of the sentence start token (<s>), $S_i$, can be used as the embedding of the sentence $S_i$. The purpose of the randomly initialized upper sentence-level transformer 120 is to contextualize the sentences in the sequence with one another. Let xi be the transformed representation of the sentence $S_i$, produced by the upper transformer 120. The segmentation prediction for the sentence $S_i$ is then made by the segmentation classifier 130 (e.g., a simple feed-forward softmax classifier: $Y_i$=softmax $(Wx_i+b)$). Binary cross-entropy loss can be minimized.

Adapter-Based Training. The lower transformer 110 can be initialized with RoBERTa weights, encoding general-purpose distributional knowledge. Full fine-tuning, in which all transformer parameters are updated in downstream training, may overwrite useful distributional signal with domain-specific artefacts, overfit the model to the training domain, and impede domain transfer for the downstream task. Alternatively, adapter-based fine-tuning injects additional adapter parameters into transformer layers and updates only them during downstream fine-tuning, keeping the original transformer parameters unchanged. To address these issues, a bottleneck adapter architecture can be adopted such that, in each layer of the lower transformer 110, two bottleneck adapters can be inserted: one after the multi-head attention sublayer and another after the feed-forward sublayer. Let $X \in \mathbb{R}^{T \times H}$ stack contextualized vectors for the sequence of T tokens in one of the transformer layers, input to the adapter layer. The adapter then yields the following output:

$$X' = X + g(XW_d + b_d)W_u + b_u.$$

The parameter matrix $Wd \in \mathbb{R}^{H \times a}$ down-projects the token vectors from X to the adapter size a<H, and $W_u \in \mathbb{R}^{a \times H}$ up-projects the activated down-projections back to transformer's hidden size H; g is the non-linear activation function.

Training Instances and Inference. The HITS model with sequences of N sentences as instances can be created by sliding the window of size N over document's sentences, with a sliding step of N/2. At inference, for each sentences, predictions can be made for all of the windows that contains. This means that (at most) N segmentation probabilities are obtained for each sentence (for the i-th sentence, we get predictions from windows [i−N+1: i], [i−N+2: i+1], . . . , [i: i+N−1]). The sentence's segmentation probabilities obtained across different windows can be averaged and it can be predicted that a sentence starts a new segment if the average is above the threshold t. The sequence length N and threshold t can act as hyperparameters and be optimized using the development datasets Wiki727 and K12Seg. Each of such data sets has three disjoint portions: "train" portion (or train dataset), "development" (or sometimes also called "validation") portion (or development dataset) and test (or "evaluation") portion/dataset.

WIKI727. WIKI727 is a large segment-annotated dataset designed for supervised text segmentation. It consists of 727K Wikipedia articles (train portion: 582K articles), automatically segmented according to the articles' heading structure.

K12SEG. As noted above, to empirically evaluate domain transfer in supervised text segmentation, a new dataset, K12SEG, was created from educational reading material designed for grade-1 to college-level students. The seed dataset, the Educators Word Frequency, was created by standardized sampling of reading materials from a variety of content areas (e.g. science, social science, home economics, fine arts, health, business etc.). Each sample is 250-325 words long. One synthetic K12SEG instance was created by selecting and concatenating two samples from (a) the same book, (b) different books from the same content area (e.g., science) or (c) different books from different content areas. In contrast to WIKI727, in which the number and sizes of segments greatly vary across Wikipedia articles, K12SEG documents are more uniform: with two segments (samples) each and minor variation in sentence length (mean: 30 sentences). Besides the different genre between WIKI727 and K12SEG, this stark difference between their distributions of segment numbers and sizes poses an additional challenge for the domain transfer. The total of 18,906 K12SEG documents were split into train (15,570 documents), development (3,000), and test portions (336). An example 2-segment document from from K12SEG is shown in Table 1.

Wikipedia-Based Test Sets. For an in-domain (Wikipedia) evaluation, three small-sized test sets were used: WIKI50 which is an additional test set consisting of 50 documents, in addition to: CITIES which comprises 64 articles, and ELEMENTS which comprises 117 articles from Wikipedia pages of world cities and chemical elements, respectively.

Experiments. Two sets of experiments were conducted. First, the performance of the HITS model was benchmarked "in domain", i.e., by training it on WIKI727 and evaluating it on WIKI50, ELEMENTS, and CITIES. Here, HITS (with full and adapter-based fine-tuning) was directly compared with state-of-the-art segmentation models: the hierarchical Bi-LSTM (HBi-LSTM), and two hierarchical transformer variants of Glavas and Somasundaran—with (CATS) and without (TLT-TS) the auxiliary coherence objective. The second set of experiments quantified the efficacy of HITS in transfer for the educational domain. The performance of "in-domain" training on K12SEG was compared with transfer strategies: (i) zero-shot transfer: HITS variants (full and adapter-based fine-tuning) trained on WIKI727 and evaluated on the K12SEG test set and (ii) sequential training: HITS variants sequentially trained first on WIKI727 and then on the train portion of K12SEG.

Training and Optimization Details. The weights of the lower transformer network in all HITS variants were initialized with the pretrained RoBERTa Base model, having $L_L=12$ layers (with 12 attention heads each) and hidden representations of size H=768. The upper-level transformer 120 for sentence contextualization had $L_U=6$ layers (with 6 attention heads each), and the same hidden size H=768. A dropout (p=0.1) was applied on the outputs of both the lower and upper transformer outputs 110, 120. In adapter-based fine-tuning, the adapter size was set to a=64 and GeLU was used as the activation function. In the experiments, the sentence input was limited to T=128 subword tokens (shorter sentences are padded, longer sentences trimmed). The models' parameters were optimized using the Adam algorithm with the initial learning rate of $10^{-5}$. Training occurred for at most 30 epochs over the respective training set (WIKI727 or K12SEG), with early stopping based on the loss on the respective development set. Training was conducted in batches of 32 instances (i.e., 32 sequences of N sentences) and it was found (via cross-validation on respective development sets) that the optimal sequence length was N=16 sentences and the optimal average segmentation probability threshold at inference time was t=0.35.

TABLE 1

An example 2-segment document from the K12SEG dataset.

| First segment | Second segment |
|---|---|
| Traveling familiar routes in our family cars we grow so accustomed to crossing small bridges and viaducts that we forget they are there. We have to stop and think to remember how often they come along. Only when a bridge is closed for repairs and we have to take a long detour do we realize how difficult life would be without it. Try to imagine our world with all the bridges removed. In many places life would be seriously disrupted, traffic would be paralyzed, and business would be terrible. Bridges bring us together and keep us together. They are a basic necessity for civilization. The first structures human beings built were bridges. Before prehistoric people began to build even the crudest shelter for themselves, they bridged streams. Early prehistoric tribes were wanderers. Since they did not stay in one place they did not think of building themselves houses. But they could not wander far without finding a stream in their way. Nature provided the first bridges. Finding themselves confronted with some narrow but rapid river, humans noticed a tree that had fallen across the river from bank to bank. The person who first scrambled across a fallen log, perhaps after watching monkeys run across it, was the first human being to cross a bridge. Eventually, when they had learned how to chop down a tree, they also learned how to make a tree fall in the direction they wanted it to fall. The wandering tribe that first deliberately made a free fall across & stream were the first bridge-builders. | Working in the mud and water of a river bottom was difficult and dangerous. People were often crushed or maimed by the pile driver or the piles. But the work on the foundations is the most important part of bridge-building. The part of a bridge that is underwater, the part we never see, is more important than the part we do see, because no matter how well made the superstructure may be, if the foundation is not solid the bridge will fall. Not only did the pier foundations have to be solid, they also had to be protected as much as possible from wear. A flowing river constantly stirs up the bottom, so that the water's lower depths are a thick soup filled with mud and sand and pebbles which grind against anything in the path of the current This action is called scour, to reduce the wear and tear of the current, the Romans built the fronts of their piers in the shape of a boat's prow. The Romans used only one kind of arch, the semicircular. The arch describes a full half-circle from pier to pier. Each end of the half-circle rests on a pier, and the two piers will hold the arch up by themselves, even before the rest of the bridge is built, provided each pier is at least one third as thick as the width of the arch. Thus a bridge could be built one arch at a time, and if the work had to stop the partial structure would stay in place until work could be resumed. The Romans built their bridges during the summer and fall, when the weather was best and the water level was generally lowest, and stopped during winter and spring. |

Results. The results are reported in terms of $P_K$ which is an evaluation metric for text segmentation. $P_K$ is the percentage of wrong predictions on whether or not the first and last sentence in a sequence of K consecutive sentences belong to the same segment. K was set to one half of the average gold-standard segment size of the evaluation dataset.

In-Domain Wikipedia Evaluation. The results of the in-domain Wikipedia evaluation on WIKI50, CITIES, and ELEMENTS are provided in Table 2. The current HITS model variants, which was trained with the pretrained RoBERTa as the token-level transformer, outperformed the hierarchical neural models which start from a randomly initialized token-level encoder. It will be appreciated that fine-tuning pretrained transformers yields better results than task-specific training from scratch, even if the dataset is large (as is the case with WIKI727). Full fine-tuning produces better results on WIKI50, whereas adapter-based fine-tuning exhibits stronger performance on CITIES and ELEMENTS. As the articles in WIKI50 come from a range of Wikipedia categories, much like in the training set WIKI727, whereas CITIES and ELEMENTS each contain articles from a single category, these results indicate that full fine-tuning is more prone to domain (genre, topic) overfitting than adapter-based tuning. Of note, the current HITS model (Full) surpassed the human WIKI50 performance, reported to stand at 14.97 $P_K$ points.

TABLE 2

"In-domain" performance of hierarchical neural segmentation models, trained on the large WIKI727 dataset, on three Wikipedia-based test sets (smaller values of the error measure. $P_K$ mean better performance).

| Model | Fine-tuning | WIKI50 | CITIES | ELEM. |
|---|---|---|---|---|
| HBi-LSTM | — | 18.24 | 19.68 | 41.63 |
| TLT-TS | — | 17.47 | 19.21 | 20.33 |
| CATS | — | 16.53 | 16.85 | 18.41 |
| HITS (ours) | Full | 14.50 | 15.03 | 17.06 |
| HITS (ours) | Adapter | 15.17 | 14.11 | 14.67 |

Domain Transfer Results. Table 3 shows the performance of both in-domain and transferred HITS model variants on the K12SEG test set. With Full fine-tuning, it was observed that the same performance was achieved regardless of whether we train the model on the out-of-domain (but much larger) WIKI727 dataset or the (smaller) in-domain K12SEG training set. Also of note, adapter-based fine-tuning in the zero-shot domain transfer yielded better performance than in-domain adapter fine-tuning. Poor performance of in-domain training may mean that K12SEG is either (a) insufficiently large or (b) contains such versatile segmentation examples over which it is hard to generalize. Gains from sequential domain transfer, in which the model is exposed to exactly the same K12SEG training set but only after it was trained on a much larger out-of-domain WIKI727 dataset, point to (a) as the more likely explanation. In both in-domain and zero-shot setups, adapter-based fine-tuning produces better segmentation than full fine-tuning, contributing to the conclusion that adapter-based fine-tuning curbs overfitting to domain-specific arte-facts, improving the model's generalization ability. Finally, the sequential training in which the lower transformer's parameters (including the adapters) during the (secondary) in-domain training were frozen which gave the best result overall. It is believed that the relatively small K12SEG train set gives the advantage to the model variant that uses that limited-size data to fine-tune fewer parameters (i.e., only the upper, sentence-level transformer 120).

TABLE 3

Segmentation performance in domain transfer.

| Setup | Fine-tuning | Freeze | K12SEG (test) |
|---|---|---|---|
| In domain | Full | — | 25.5 |
|  | Adapter | — | 23.9 |
| Zero-shot | Full | — | 25.5 |
|  | Adapter | — | 20.7 |
| Sequential | Full | No | 12.9 |
|  | Full | Yes | 14.8 |
|  | Adapter | No | 13.3 |
|  | Adapter | Yes | 10.4 |

Evaluation on K12SEG test set.
In domain: training on the K12SEG train set; Zero-shot: training on the train portion of WIK1727; Sequential: sequential training, first on WIK1727 and then on the train portion of K12SEG. For Sequential training, the column Freeze specifies whether the the lower transformer's parameters were frozen during secondary, in-domain fine-tuning (on the train portion of K12SEG).

Figure 2:
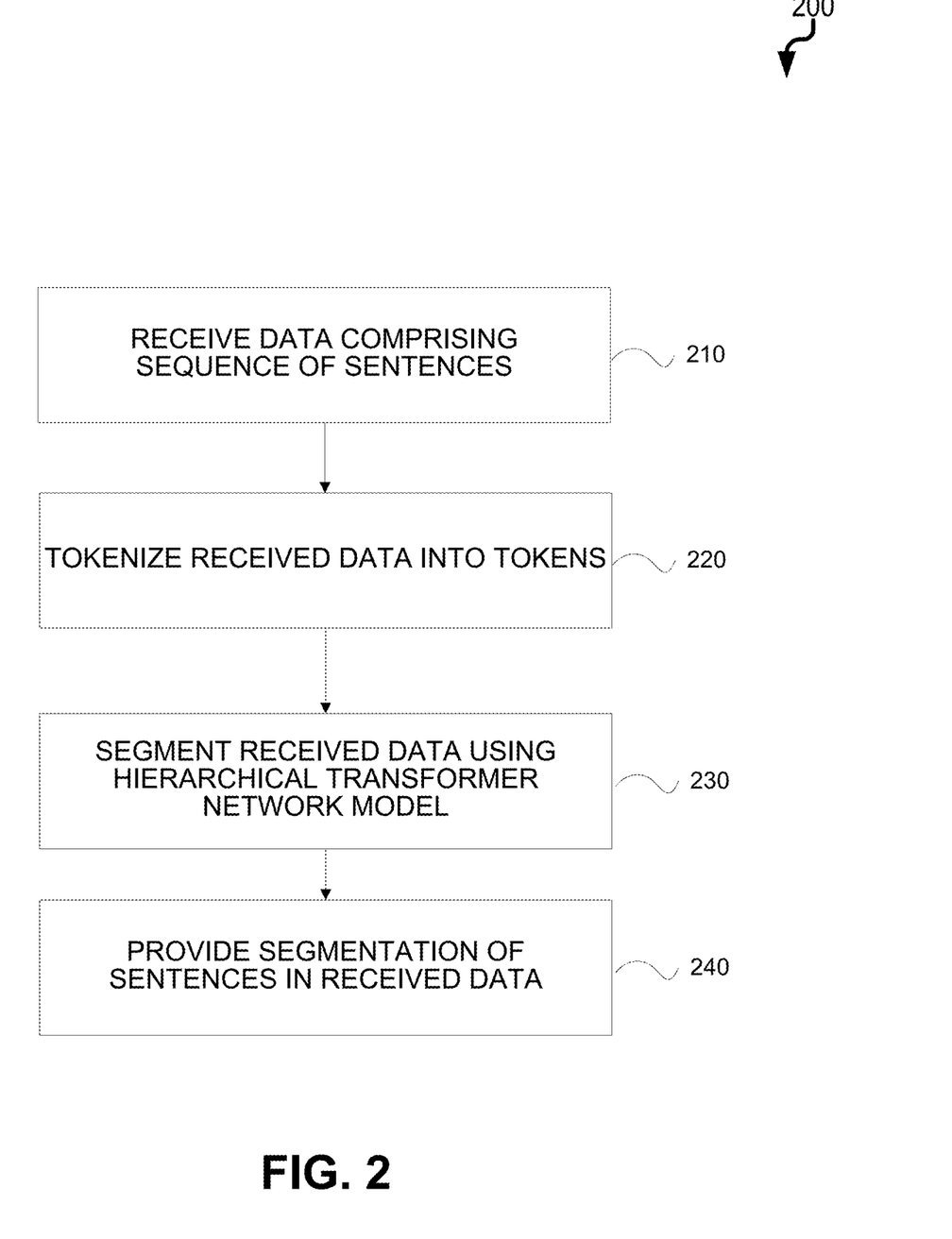
FIG. 2 is a process flow diagram illustrating a machine-learning based technique for supervised text segmentation.

FIG. 2 is a diagram 200 illustrating a process flow diagram for text segmentation in which, at 210, data is received that comprises unstructured text including a sequence of sentences. Thereafter, at 220, the received data is tokenized into a plurality of tokens. The received data is then segmented, at 230, using a hierarchical transformer network model. The hierarchical transformer network model includes a token transformer, a sentence transformer, and a segmentation classifier. The token transformer contextualizes tokens within sentences and yielding sentence embeddings. The sentence transformer contextualizes sentence representations based on the sentence embeddings. The segmentation classifier predicts segments of the received data based on the contextualized sentence representations. Data can then be provided, at 240, that characterizes the segmentation of the received data.

Figure 3:
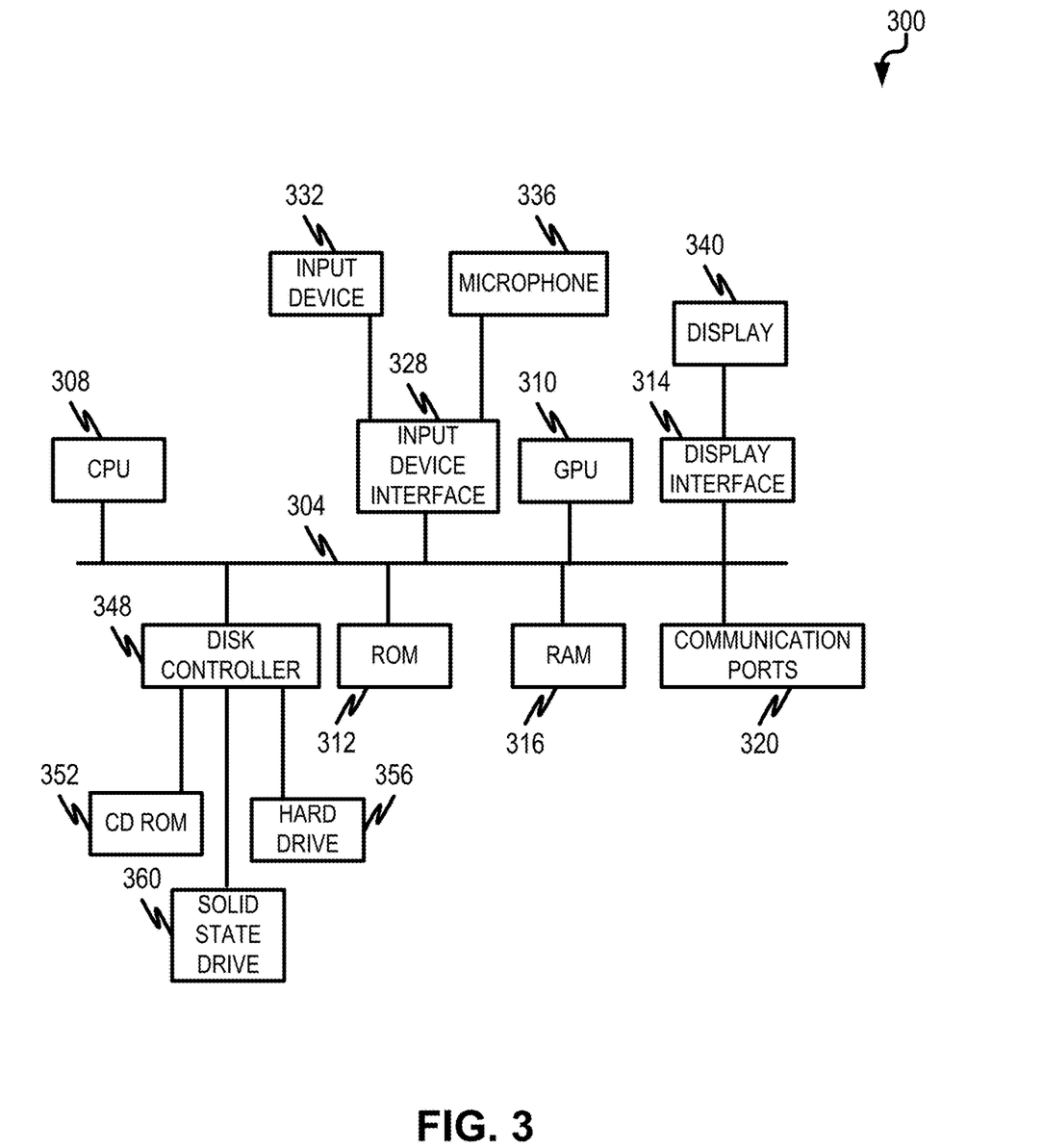
FIG. 3 is a diagram illustrating aspects of a computing device for implementing the current subject matter.

FIG. 3 is a diagram 300 illustrating a sample computing device architecture for implementing various aspects described herein. A bus 304 can serve as the information highway interconnecting the other illustrated components of the hardware. A processing system 308 labeled CPU (central processing unit) (e.g., one or more computer processors/data processors at a given computer or at multiple computers) and/or a graphical processing unit 310 labeled GPU, can perform calculations and logic operations required to execute a program. A non-transitory processor-readable storage medium, such as read only memory (ROM) 312 and random access memory (RAM) 316, can be in communication with the processing system 308 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 348 can interface with one or more optional disk drives to the system bus 304. These disk drives can be external or internal floppy disk drives such as 360, external or internal CD-ROM, CD-R, CD-RW or DVD, or solid state drives such as 352, or external or internal hard drives 356. As indicated previously, these various disk drives 352, 356, 360 and disk controllers are optional devices. The system bus 304 can also include at least one communication port 320 to allow for communication with external devices either physically connected to the computing system or available externally through a wired or wireless network. In some cases, the at least one communication port 320 includes or otherwise comprises a network interface.

To provide for interaction with a user, the subject matter described herein can be implemented on a computing device having a display device 340 (e.g., a CRT (cathode ray tube) or LCD (liquid crystal display) monitor) for displaying information obtained from the bus 304 via a display interface 314 to the user and an input device 332 such as a keyboard and/or a pointing device (e.g., a mouse or a trackball) and/or a touchscreen by which the user can provide input to the computer. Other kinds of input devices 332 can be used to provide for interaction with a user as well; for example, feedback provided to the user can be any form of sensory feedback (e.g., visual feedback, auditory feedback by way of a microphone 336, or tactile feedback); and input from the user can be received in any form, including acoustic, speech, or tactile input. The input device 332 and the microphone 336 can be coupled to and convey information via the bus 304 by way of an input device interface 328. Other computing devices, such as dedicated servers, can omit one or more of the display 340 and display interface 314, the input device 332, the microphone 336, and input device interface 328.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for text segmentation, comprising:
   receiving an unstructured dataset built from a plurality of educational reading materials, wherein the unstructured dataset comprises a sequence of sentences;
   tokenizing the unstructured dataset into a plurality of tokens;
   contextualizing the plurality of tokens within the sequence of sentences by a token transformer and yielding sentence embeddings, wherein at least the token transformer was previously fine-tuned on a structured dataset not built from the plurality of educational reading materials;
   contextualizing sentence representations by a sentence transformer based on the sentence embeddings, wherein the sentence transformer and the token transformer are hierarchically linked;
   predicting at least one segment of the unstructured dataset by a segmentation classifier based on the contextualized sentence representations; and
   providing data characterizing the at least one predicted segment of the unstructured dataset.

2. The method of claim 1, wherein the providing data comprises at least one of: causing the provided data to be displayed in an electronic visual display, transmitting the provided data to a remote computing device, storing the provided data in physical persistence, or loading the provided data into memory.

3. The method of claim 1, wherein the token transformer comprises a plurality of layers, wherein at least one layer of the plurality comprises a multi-head attention sublayer and a feed-forward sublayer.

4. The method of claim 3, wherein the at least one layer of the plurality comprises a first bottleneck adapter positioned after the multi-head attention sublayer and a second bottleneck adapter positioned after the feed-forward sublayer.

5. The method of claim 4, wherein the token transformer comprises a plurality of original parameters that are initialized with weights of a pretrained RoBERTa model.

6. The method of claim 5, wherein the pretrained RoBERTa weights encode general-purpose distributional knowledge.

7. The method of claim 6, wherein the plurality of original parameters remains unchanged throughout adapter-based fine-tuning, such that the distributional knowledge is preserved.

8. The method of claim 7, wherein the at least one layer of the plurality is augmented with adapter parameters that are updated during adapter-based fine-tuning.

9. The method of claim 8, wherein both the plurality of original parameters and the adapter parameters are configured to remain unchanged after the unstructured dataset is received.

10. The method of claim 1, wherein the structured dataset comprises a segment-annotated sequence of sentences.

11. The method of claim 10, wherein the annotated dataset is segmented by a heading structure.

12. The method of claim 1, wherein the sentence transformer is randomly initiated.

13. The method of claim 1, wherein the unstructured dataset is synthetically created at least by selecting and concatenating two samples from a same book, different books from a same content area, different books from different content areas, or a combination thereof.

14. The method of claim 1, further comprising sliding a window over at least one sentence of the sequence to generate a plurality of probabilities that the at least one sentence starts a new segment.

15. The method of claim 14, wherein the plurality of probabilities is averaged, and the segmentation classifier is configured to predict that the at least one sentence starts a new segment if the average is above a predetermined threshold.

16. A system for text segmentation, comprising:
   at least one data processor; and
   a memory including instructions which, when executed by the at least one data processor, result in operations comprising:
      receiving an unstructured dataset built from a plurality of educational reading materials, wherein the unstructured dataset comprises a sequence of sentences;
      tokenizing the unstructured dataset into a plurality of tokens;
      contextualizing the plurality of tokens within the sequence of sentences by a token transformer and yielding sentence embeddings, wherein at least the token transformer was previously fine-tuned on a structured dataset not built from the plurality of educational reading materials;
      contextualizing sentence representations by a sentence transformer based on the sentence embeddings, wherein the sentence transformer and the token transformer are hierarchically linked;

predicting at least one segment of the unstructured dataset by a segmentation classifier based on the contextualized sentence representations; and providing data characterizing the at least one segment of the unstructured dataset.

17. A computer-implemented method of training a neural network for text segmentation, comprising:

receiving a first training dataset from a non-educational domain, the first dataset comprising a sequence of sentences;

training a hierarchical transformer network model out-of-domain, comprising:

tokenizing the first dataset into a plurality of tokens;

initializing weights of parameters of a token transformer;

contextualizing the plurality of tokens within the sequence of sentences by the token transformer and yielding a plurality of sentence embeddings;

contextualizing a plurality of sentence representations by a sentence transformer based on the plurality of sentence embeddings;

predicting, by a segmentation classifier, whether a sentence in the sequence starts a segment based on the plurality of contextualized sentence representations;

updating at least one adapter parameter of the token transformer;

receiving a second training dataset from an educational domain, the second dataset comprising a second sequence of sentences;

training the hierarchical transformer network model in-domain, comprising:

tokenizing the second dataset into a second plurality of tokens;

initializing the token transformer with the at least one updated adapter parameter;

contextualizing the second plurality of tokens within the second sequence of sentences by the token transformer and yielding a second plurality of sentence embeddings;

contextualizing a second plurality of sentence representations by the sentence transformer based on the second plurality of sentence embeddings; and predicting, by the segmentation classifier, whether a second sentence in the second sequence starts a second segment based on the second plurality of contextualized sentence representations.

18. The method of claim 17, wherein the weights of parameters of the token transformer comprise of a plurality of RoBERTa parameters.

19. The method of claim 18, wherein the plurality of RoBERTa parameters are frozen throughout the in-domain training.

20. The method of claim 17, wherein the educational domain is designed for grade-1 to college-level student populations.

* * * * *